(12) United States Patent
Freelander et al.

(10) Patent No.: US 7,404,143 B2
(45) Date of Patent: Jul. 22, 2008

(54) SERVER-BASED SINGLE ROUNDTRIP SPELL CHECKING

(75) Inventors: Jack Freelander, Monroe, WA (US); Shawn Derek Bracewell, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 307 days.

(21) Appl. No.: 10/746,401

(22) Filed: Dec. 26, 2003

(65) Prior Publication Data

US 2005/0149867 A1 Jul. 7, 2005

(51) Int. Cl.
*G06F 17/00* (2006.01)
(52) U.S. Cl. .................. 715/257; 715/256; 382/231
(58) Field of Classification Search ................ 715/533, 715/257, 256; 382/231
See application file for complete search history.

(56) References Cited

U.S. PATENT DOCUMENTS

| 4,829,472 | A | * | 5/1989 | McCourt et al. ............ 715/533 |
| 5,678,053 | A | * | 10/1997 | Anderson ...................... 704/1 |
| 5,907,680 | A | * | 5/1999 | Nielsen ....................... 709/228 |
| 6,088,702 | A | * | 7/2000 | Plantz et al. ............. 707/103 R |
| 2002/0078106 | A1 | * | 6/2002 | Carew et al. ............... 707/533 |
| 2003/0145285 | A1 | * | 7/2003 | Miyahira et al. ............ 715/533 |
| 2005/0235031 | A1 | * | 10/2005 | Schneider et al. ........... 709/203 |

OTHER PUBLICATIONS

Miller, Robert C., et al, "Managing User Interaction: Outlier Finding: Focusing User Attention on Possible Errors", Proceedings of the 14th Annual ACM Symposium on User Interface Software and Technology, Nov. 2001, pp. 81-90.*
Wintertree Software, Wintertree Spelling Server Examples, downloaded from http://www.wintertree-software.com/dev/spellingserver/examples.html, Jul. 2002, pp. 1-5.*
Wintertree Software, Wintertree Spelling Server Examples, downloaded from http://www.wintertree-software.com/dev/spellingserver/examples.html, Jul. 2002, pp. 1-11.*
D. Fallman, "The Penguin: Using the Web as a Database for Descriptive and Dynamic Grammar and Spell Checking", CHI 2002: Changing the World, Changing Ourselves, pp. 616-617, Apr. 20-25, 2002.

* cited by examiner

*Primary Examiner*—Laurie Ries
(74) *Attorney, Agent, or Firm*—Merchant & Gould P.C.

(57) ABSTRACT

A single-roundtrip server-based spell checking service is provided. A client provides a composition to the server to be spell checked. The server performs a spell check on the composition and flags the words that are determined to be errors. The server may provide suggested corrections for the flagged words in the composition depending on the error. The suggested corrections are compressed before they are sent to the client. While a word may be misspelled several times throughout the composition, the suggested corrections for the word are only sent one time. Spell check options may also be set to help control the spell check operation.

22 Claims, 7 Drawing Sheets

```
HTTP/1.1 200 OK
Content-Type: text/xml                              700

<spellcheckresults>  710
 <flaggedwords>
  <fw>  720
   <word>helo</word>  725
   <type>UnknownWord</type>  730
   <offset>0</offset>  735                           715
  </fw>
  <fw>
   <word>the</word>
   <type>RepeatWord</type>  740
   <offset>15</offset>  745
  </fw>
 </flaggedwords>
 <suggestions>
  <sl>
   <word>helo</word>  755
   <sug>hello</sug>
   <sug>halo</sug>
   <sug>helot</sug>  760                             750
   <sug>hellos</sug>
   <sug>hell</sug>
   <sug>help</sug>
  </sl>
 </suggestions>
</spellcheckresults>
```

*Fig. 7*

SERVER-BASED SINGLE ROUNDTRIP SPELL CHECKING

BACKGROUND OF THE INVENTION

Many web-based clients include a spell checking feature to help find spelling errors in a document. In these applications, a user typically invokes a spell checker by selecting a spelling tool option. Typically, the spelling application receives a portion of the document from the client and identifies potentially misspelled words. For every potentially misspelled word, the spelling application sends the portion of the document back to the client along with information indicating the misspelled words. The user may then be prompted to replace, ignore, or edit the word. Typically the spell checker also provides a variety of alternative spellings to choose from. This process continues until the user either expressly exits the spelling tool or the spelling tool finishes checking the document.

This web-based spell checking process can be very inefficient for several reasons. First, the same information may be sent to the client many different times. Additionally, the time it takes to complete the spell checking process may be slower than desired. What is needed is a way to improve the performance spell checking for web-based applications.

SUMMARY OF THE INVENTION

The present invention is directed towards providing server-based single roundtrip spell checking for web based clients.

According to one aspect of the invention, a client provides a composition to the server to be spell checked. The server performs a spell check on the entire composition and flags the words that are determined to be errors.

According to another aspect of the invention, the server may provide suggested corrections for the flagged words in the composition depending on the error.

According to another aspect of the invention, the suggested corrections are compressed before they are sent to the client. While a word may be misspelled several times throughout the composition, the suggested corrections for the word are only sent one time.

According to yet another aspect of the invention, options may be set relating to the spell check. The options are used to help control the spell check operation.

BRIEF DESCRIPTION OF THE DRAWINGS

FIG. 7 illustrates an exemplary HTTP response for spell checking a composition, in accordance with aspects of the invention.

DETAILED DESCRIPTION OF THE PREFERRED EMBODIMENT

The present invention is directed towards providing server-based single roundtrip spell checking for web based clients. Generally, a client transmits a composition to a server that performs a spell check operation and returns a spell check response to the client that includes flagged words and suggested corrections.

Illustrative Operating Environment

Figure 1:
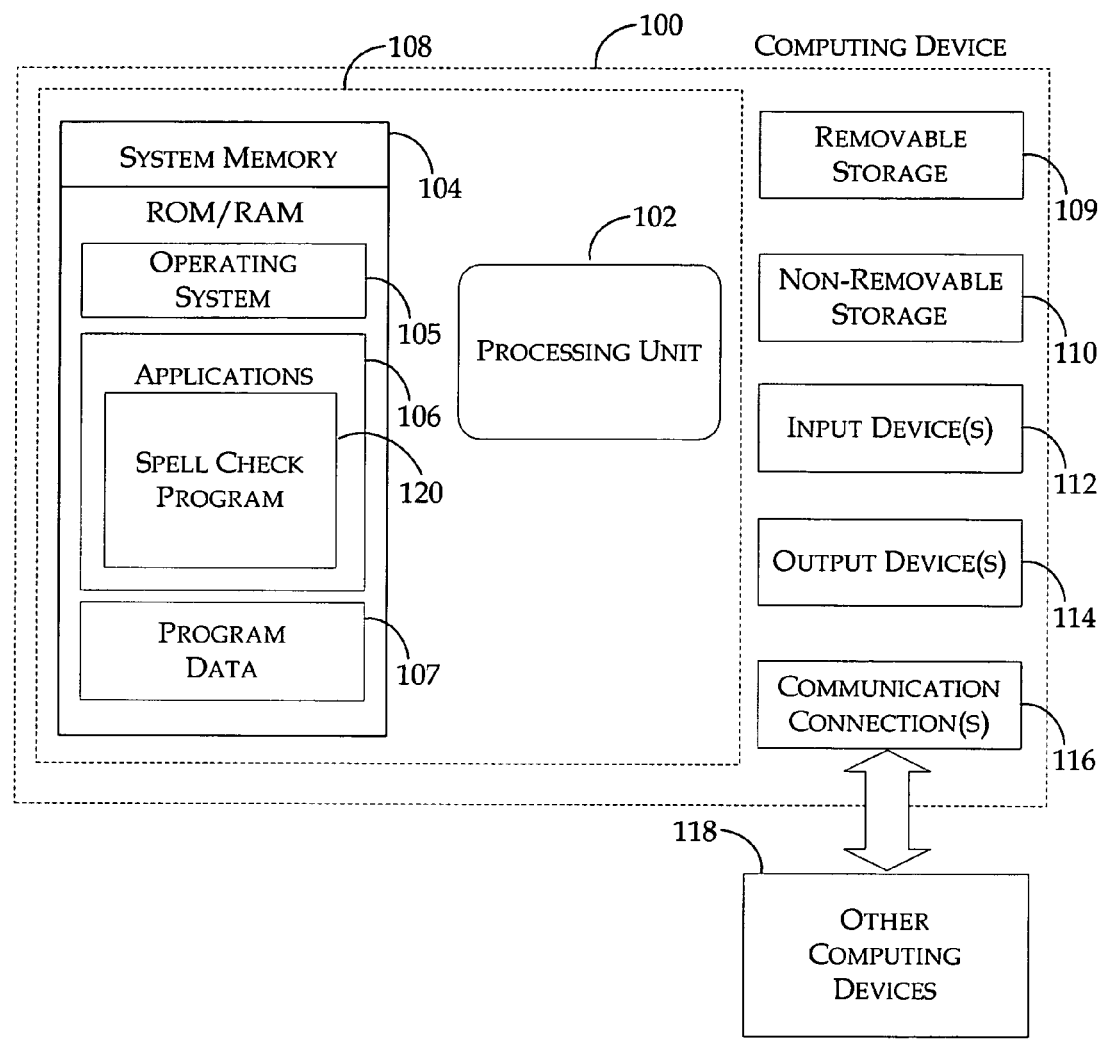
FIGS. 1 and 2 illustrate exemplary computing devices that may be used according to exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a spell check application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
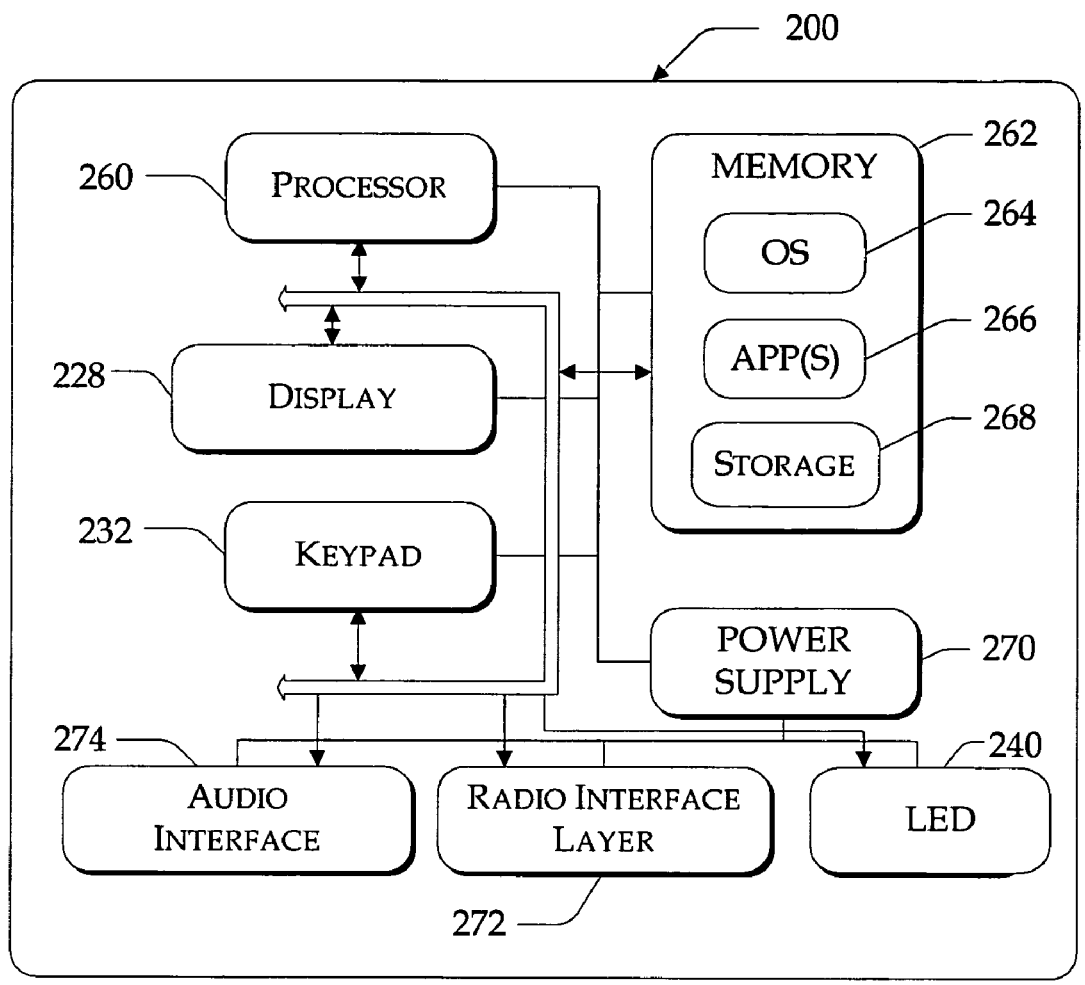

FIG. 2 illustrates a mobile computing device that may be used according to an exemplary embodiment of the present invention. Mobile computing device 200 includes processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, such as the Windows CE operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then could also act as an input device.

One or more application programs 266 are loaded into memory 262 and run on the operating system 264. A spell checking application resides on mobile computing device 200 and is programmed to provide operations relating to a spell checking operation. The spell checking application may reside in the hardware or software of the device. Mobile computing device 200 also includes non-volatile storage 268 within memory 262. Non-volatile storage 268 may be used to store persistent information which should not be lost if mobile computing device 200 is powered down.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes wireless interface layer 272 that performs the function of transmitting and receiving wireless communications. The wireless interface layer 272 facilitates wireless connectivity between the mobile computing device 200 and the outside world. According to one embodiment, transmissions to and from the wireless interface layer 272 are conducted under control of the operating system 264. In other words, communications received by wireless interface layer 272 may be disseminated to application programs 266 via operating system 264, and vice versa.

Communications connections are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Spell Check System

Figure 3:
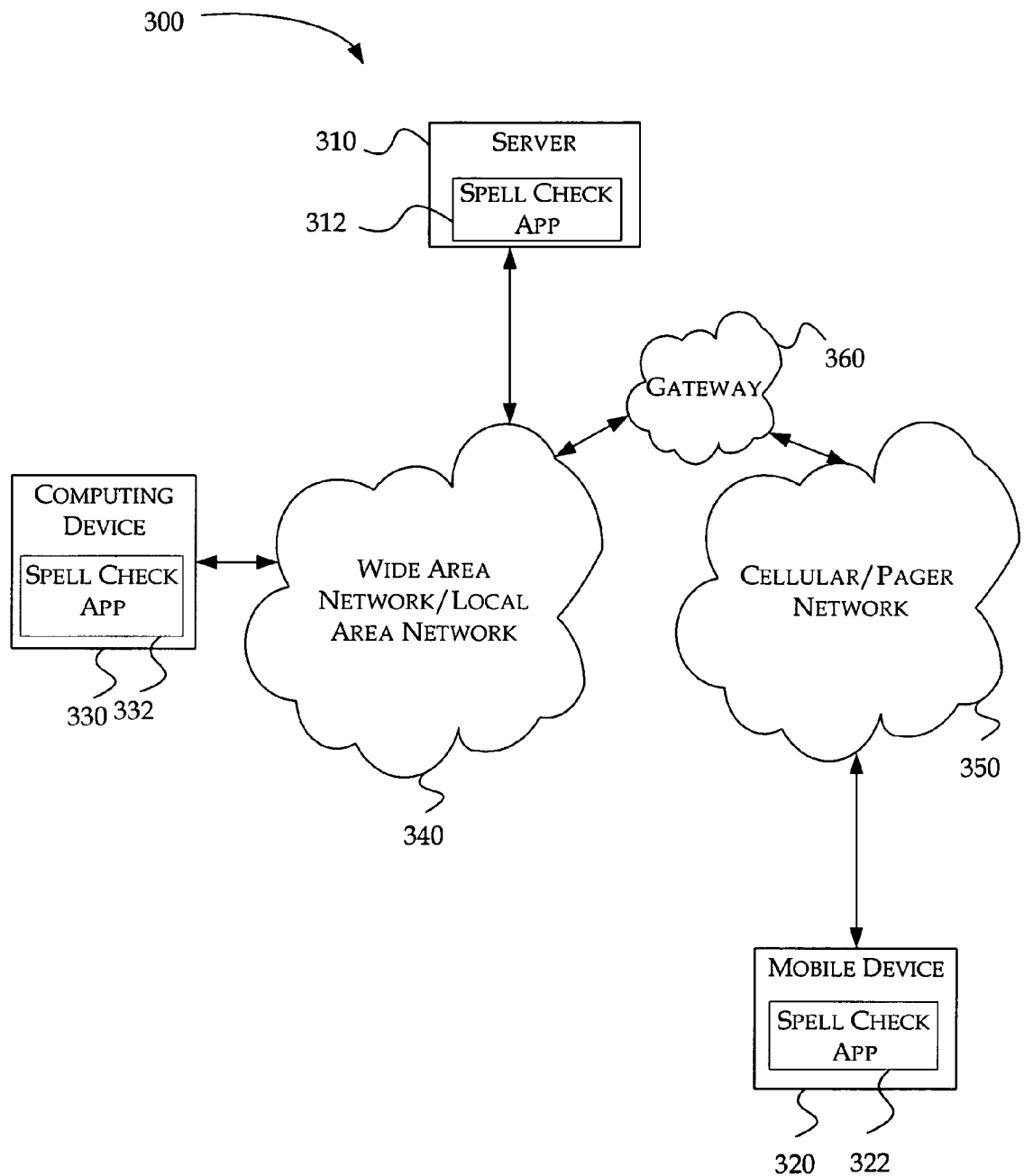
FIG. 3 shows a functional block diagram generally illustrating a spell check system for a single roundtrip spell check service.

FIG. 3 is a functional block diagram generally illustrating a spell check system 300 for a single roundtrip spell check service, in accordance with aspects of the invention. Server 310 and computing device 330 are computing devices such as the one described above in conjunction with FIG. 1 and mobile device 320 is a mobile computing device such as the one described above in conjunction with FIG. 2.

Server 310 runs a spell check application 312. Spell check application 312 is configured to perform a spell check on the composition it receives from the client and provide a spell check response to the client. Any computing device, such as computing device 320 and 330, may send a composition to be spell checked. The composition is transmitted over a wide area network (WAN)/local area network (LAN) 340. One example of a WAN is the Internet that connects millions of computers over a host of gateways, routers, switches, hubs, and the like. An example of a LAN is a network used to connect computers in a single office. A WAN may connect multiple LANs.

The user may initiate a spell check session from any device. A client spell checking application such as 322 or 332 residing on mobile device 320 or computing device 330 is configured to initiate the spell check and to communicate with the spell check application 312 on server 310. Application 322 and 332 and spell check application 312 may communicate using any one of several client-server protocols.

Cellular/pager network 350 is a network responsible for delivering messages to and receiving messages from wireless devices. The cellular/pager network 350 may include both wireless and wired components. For example, cellular/pager network may include a cellular tower that is linked to a wired telephone network. Typically, the cellular tower carries communication to and from cell phones, long-distance communication links, and the like.

Gateway 360 routes messages between cellular/pager network 350 and WAN/LAN 340. For example, a computer user may send a message that is addressed to a cellular phone. Gateway 360 provides a means for transporting the message from the WAN/LAN 340 to cellular/pager network 350. Conversely, a user with a device connected to a cellular network may be browsing the Web. Gateway 360 allows hyperlink text protocol (HTTP) messages to be transferred between WAN/LAN 340 and cellular/pager network 350.

The spell check client (322 or 332) transmits a user's composition from the client to the server in its entirety along with various options to control the spell check operation. According to one embodiment of the invention, the spell check client is an email client. Many different options may be set to aid in controlling the spell check operation, including, but not limited to the options to: ignore words with letters and digits; change the speller language; and ignore capitalized words. According to one embodiment, these spell check options are passed as HTTP headers but could easily be incorporated into the body of a POST along with the composition to spell check. This single round-trip submission allows the client to offload the spell check processing to server 310 and to compress the data it returns to the client (e.g. 320 and 330).

Using the single-round-trip, spell check application 312 on server 310 component produces a list of suggested misspellings and list of suggested corrections and returns this data to the client. A typical response to the client includes a list of words that are flagged as possible errors and their offsets. According to one embodiment of the invention, an offset is the number of characters counted from the beginning of the document to a word within the composition. In order to reduce the payload of the response to the client, server 310 may utilize a compression algorithm to coalesce the suggested corrections.

For example, were a user to misspell "cat" as "catt" several times throughout a composition, server 310 returns a list of flagged errors and the suggested corrections for the misspelled words. The suggested corrections for "catt" would only listed once even though "catt" was misspelled several times. According to one embodiment, one XML section lists an offset for each error and a separate XML section lists the suggested corrections. The suggested corrections are only transmitted once since the composition is transmitted in its entirety. Spell check app 312 on server 310 may also compress the suggested corrections. The list of suggestions for a flagged word are context-free (words before and after the flagged word do not affect the list of suggested corrections).

The client application (i.e., Internet Explorer DHTML and Jscript) then parses the XML response received from server 310 and uses the data in the XML response to manipulate a DHTML TextRange object to locate, highlight and modify the possible errors with user input.

Figure 4:
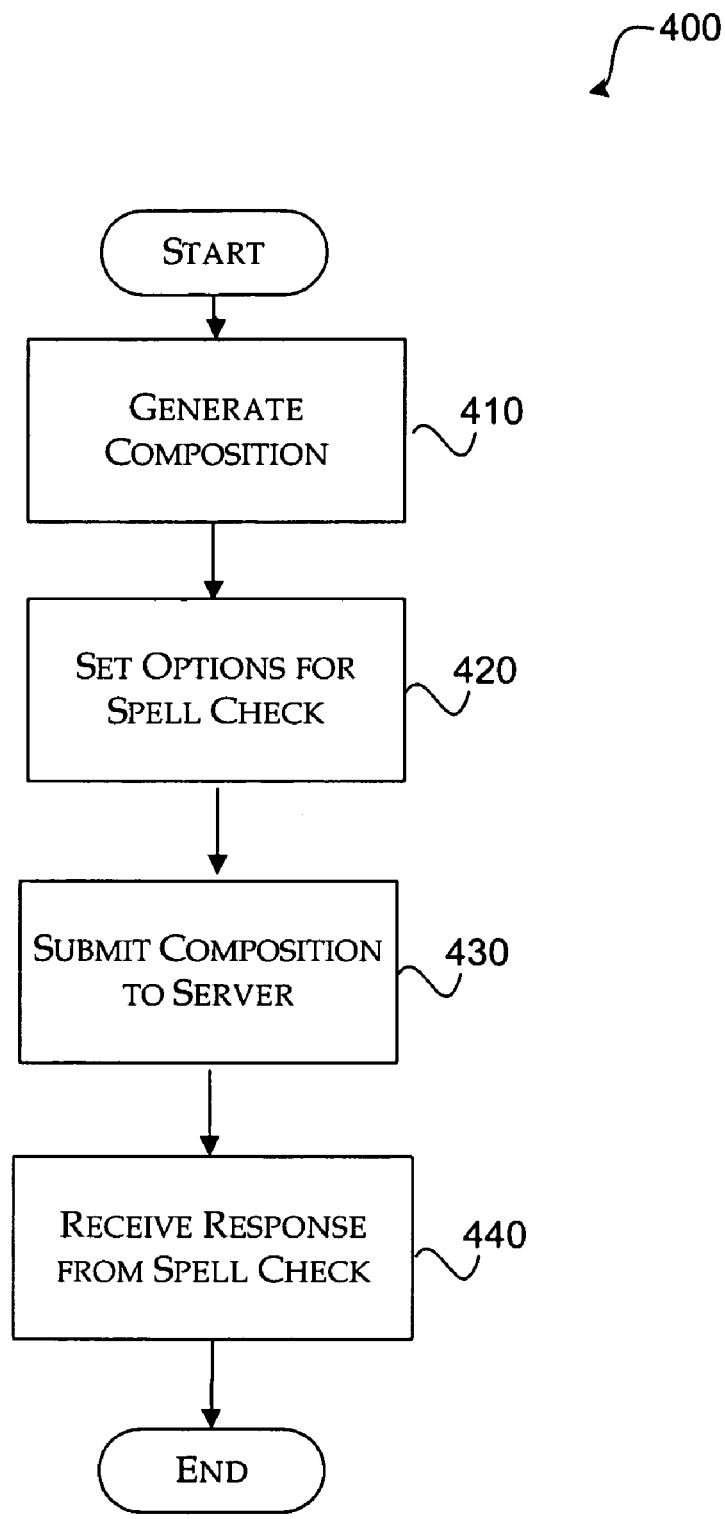
FIG. 4 illustrates a spell check process for a client.

FIG. 4 illustrates a spell check process for a client, in accordance with aspects of the invention. After a start block the process moves to block 410 where a composition is generated on the client. For example, a user may generate an email message using a web access program. Moving to block 420, the client sets the options for the spell checking process. The options may relate to the language used, ignoring all capitals, ignoring mixed digits, and the like. The process then moves to block 430 where the client submits the entire composition along with the options to the server to be spell checked. Flowing to block 440, the client receives the response from the server and receives user input relating to the response. The process then moves to an end block and returns to processing other actions.

Figure 5:
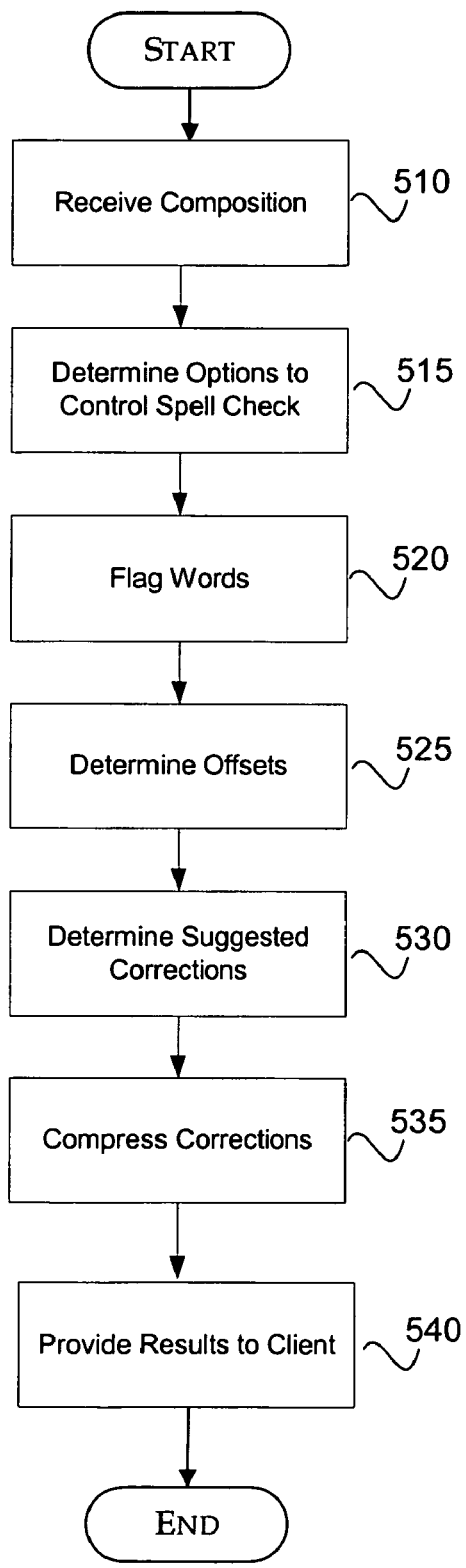
FIG. 5 illustrates a spell check process for a server.

FIG. 5 illustrates a spell check process for a server, in accordance with aspects of the invention. After a start block, the process moves to block 510 where a composition is received. Transitioning to block 515, the spell check options are determined to control the spell check of the composition. Moving to block 520, the misspelling errors are flagged. At block 525, offsets for the errors are generated. The offsets are used to aid in determining where the error occurs within the composition. According to one embodiment, the offsets are the number of characters the error is located from the beginning of the document. The offset may be provided in any way that allows the client to determine where the error is located. Alternatively, no offset may be provided, in which case the client searches for the error that was flagged within the composition. Flowing to block 530, the suggested corrections are determined. According to one embodiment, the suggested corrections are ordered in terms of the likelihood that the suggestion is correct. Moving to block 535, the suggested corrections may be compressed by removing any duplicate suggested corrections for a word that has been flagged more than one time. Next, at block 540, the results are provided to the client. The process then moves to an end block and returns to processing other actions.

Figure 6:
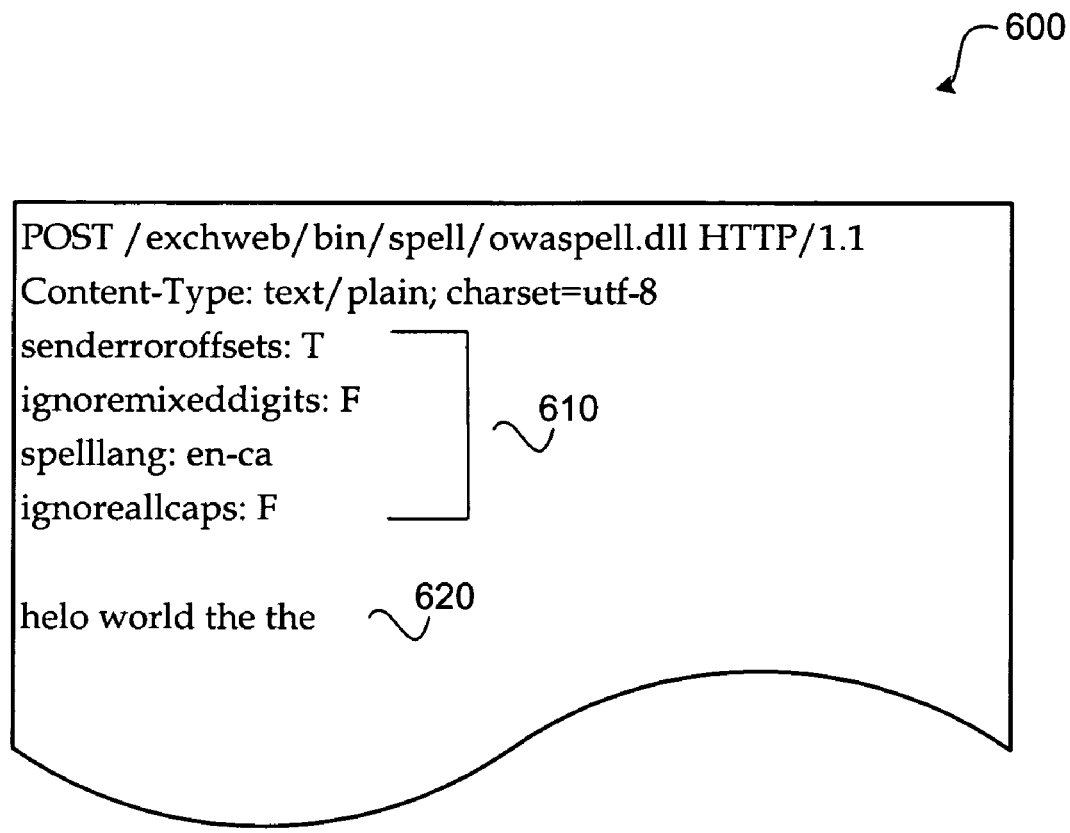
FIG. 6 shows an exemplary HTTP request for spell checking a composition.

FIG. 6 shows an exemplary HTTP request for spell checking a composition, in accordance with aspects of the invention. Request 600 includes spell check options section 610 and composition section 620. According to this particular example, the entire composition is "helo world the the." Options 610 illustrated are only a subset of the options according to one embodiment of the invention. Any option relating to spell checking may be used. According to one embodiment of the invention, the spell check options include setting the spelling language; sending the error offsets or not; ignoring mixed digits; ignoring all capitals; and limiting the number of unique errors, total errors, composition size, as well as the time spent checking the composition. The limits may be used to help prevent attacks on the server.

FIG. 7 illustrates an exemplary HTTP response for spell checking a composition, in accordance with aspects of the invention. Response 700 includes spell check results 710 that includes a flagged words section (715) and a suggestions section (750). The flagged words XML node (715) identifies all of the words within the composition that are identified as having errors. According to one embodiment of the invention, the errors include unknown word error 730, repeated word error 740, capitalization error (not shown) and accent error (not shown). Flagged words node 715 includes fw node 720 that indicates a flagged word (725), the type of error (i.e. 730 or 740) and the offset (735). As can be noticed the spell check response does not include the entire composition that was sent to the server to be spell checked. This reduces the amount of information sent back and forth between the server and client.

Suggestions node 750 provides suggestions for a word. There is only one sub-node under the suggestions node (750) for each word regardless of how many times the word appears in flagged words node (715). Suggestions node 750 includes the flagged word (755) for which the suggestions are provided for along with the list of suggestions (760). According to one embodiment, the suggestions are ordered as to the likelihood that the suggestion is correct.

As you can see from this example, the word "helo" (755) was identified as a flagged word as being unknown (misspelled) and the word "the" was detected as a repeated word (740). The offset for "helo" is zero since it is located at the beginning of the composition, whereas the offset for "the" is fifteen since it is fifteen characters from the beginning of the composition.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for spell checking a composition between a client and a server in a single round-trip, comprising:

sending a composition from the client to the server to be spell checked in its entirety in a single round-trip between the client and the server;

performing a spell check on the entire composition on the server before reporting any results of the spell check to the client;

flagging any of the words comprising the composition that are determined to be errors based on the spell check;

determining an offset for each of the flagged words; wherein the offset for each of the flagged words is a number of characters from the beginning of the composition;

determining suggested corrections for the flagged words;

removing duplicate suggested corrections from the determined suggested corrections for the flagged words;

compressing the suggested corrections after removing the duplicate suggested corrections, and providing the flagged words, before receiving an input from the client, the offset for each of the flagged words, and the compressed suggested corrections to the client from the server; wherein the entire composition is not provided to the client when the flagged words and the suggested corrections are provided to the client and wherein the suggested corrections for a flagged word are provided only one time to the client even if the word is misspelled more than one time within the composition.

2. The method of claim 1, further comprising compressing only the suggested corrections after determining the suggested corrections and before providing the suggested corrections to the client.

3. The method of claim 2, wherein flagging the words further comprises associating a type of error with the flagged word.

4. The method of claim 3, wherein the type of error is selected from at least one of the following errors: a repeated word error, an unknown word error, a capitalization word error, and an accent error.

5. The method of claim 3, wherein providing the flagged words and the suggested corrections to the client, further comprises providing the flagged words in node of a markup language document and the suggested corrections in another node of the markup language document.

6. The method of claim 3, further comprising providing the flagged words and the offsets in a markup language document.

7. The method of claim 2, further comprising setting options relating to the spell check.

8. The method of claim 7, wherein the options relating to the spell check include at least one of the following options: ignore all capitals option;
   ignore mixed digits option; spelling language option; limit unique error option;
   limit composition size option, limit total errors option; and limit time spell checking option.

9. A system for spell checking a composition in a single round-trip, comprising:
   a client including a network communication device and a client spell check application that is configured to:
      send a composition to a server to be spell checked; and
      receiving flagged words and suggested corrections from the server relating to a spell check of the entire composition; and
   wherein the server is configured to:
      receive the composition from the client;
      perform a spell check on the entire composition before sending any results of the spell check to the client;
      flag any words that are determined to be errors based on the spell check;
      determine an offset for each of the flagged words; wherein the offset for each of the flagged words is a number of characters from the beginning of the composition;
      determine suggested corrections for the flagged words;
      remove duplicate suggested corrections from the determined suggested corrections for the flagged words after determining the suggested corrections; and
      send the flagged words and the suggested corrections to the client that are based on the spell check of the entire composition without sending the entire composition to the client and wherein the suggested corrections for a flagged word are sent only one time to the client regardless of how many times the word is misspelled within the composition.

10. The system of claim 9, wherein the server is further configured to compress the suggested corrections.

11. The system of claim 10, wherein the server is further configured to associate a type of error with the flagged word.

12. The system of claim 11, wherein the type of error is selected from at least one of the following errors: a repeated word error, an unknown word error, a capitalization word error, and an accent error.

13. The system of claim 11, wherein the flagged words and the suggested corrections are sent to the client in a markup language document that comprises a node for the flagged words and another node for the suggested corrections.

14. The system of claim 10, wherein the client spell check application is further configured to set options relating to the spell check.

15. The system of claim 14, wherein the options relating to the spell check include at least one of the following options: ignore all capitals option;
   ignore mixed digits option; spelling language option; limit unique error option;
   limit composition size option, limit total errors option; and limit time spell checking option.

16. A computer-readable storage medium having computer instructions encoded thereon for spell checking a composition in a single round-trip, comprising:
   receiving a composition from a client to be spell checked in its entirety before returning results of the spell check to the client;
   performing a spell check on the composition;
   flagging any of the words comprising the composition that are determined to be errors based on the spell check;
   determining an offset for each of the flagged words; wherein the offset for each of the flagged words is a number of characters from the beginning of the composition;
   determining suggested corrections for the flagged words;
   removing duplicate suggested corrections from the determined suggested corrections for the flagged words; and
   providing a markup language document that includes flagged words~and suggested corrections that relate to the flagged words to the client and the offset for each of the flagged words; wherein the markup language document does not include the entire composition and wherein the flagged words are in a first section of the markup language document; the suggested corrections are in a second section of the markup document; and wherein the suggested corrections for a flagged word are included only one time within the markup language document regardless of how many times the word is misspelled within the composition.

17. The computer-readable storage medium of claim 16, wherein providing the markup language document that includes flagged words and suggested corrections further comprises associating a type of error with each of the flagged words.

18. The computer-readable storage medium of claim 17, wherein the type of error is selected from at least one of the following errors: a repeated word error, an unknown word error, a capitalization word error, and an accent error.

19. The computer-readable storage medium of claim 17, wherein receiving the composition from the client to be spell checked further comprises receiving options relating to the spell check.

20. The computer-readable storage medium of claim 19, wherein the options relating to the spell check include at least one of the following options: ignore all capitals option; ignore mixed digits option; spelling language option; limit unique error option; limit composition size option, limit total errors option; and limit time spell checking option.

21. The computer-readable storage medium of claim 19, wherein providing the flagged words and the suggested corrections to the client, further comprises providing the flagged words in one node and the suggested corrections in another node.

22. The computer-readable storage medium of claim 21, further comprising providing the determined offsets associated with the flagged words.

* * * * *